United States Patent [19]

Reinehr et al.

[11] 4,432,923
[45] Feb. 21, 1984

[54] PROCESS FOR THE PRODUCTION OF DRY-SPUN HOLLOW POLYACRYLONITRILE FIBERS AND FILAMENTS

[75] Inventors: Ulrich Reinehr; Toni Herbertz; Hermann-Josef Jungverdorben, all of Dormagen; Hans K. Burghartz, Neuss, all of Fed. Rep. of Germany

[73] Assignee: Bayer Aktiengesellschaft, Leverkusen, Fed. Rep. of Germany

[21] Appl. No.: 386,501

[22] Filed: Jun. 9, 1982

[30] Foreign Application Priority Data

Jul. 1, 1981 [DE] Fed. Rep. of Germany ....... 3125898

[51] Int. Cl.³ .............................................. D01F 6/18
[52] U.S. Cl. ............................... 264/206; 264/177 F; 264/209.1
[58] Field of Search ..................... 264/177 F, 206, 205, 264/207; 428/398

[56] References Cited

U.S. PATENT DOCUMENTS

| | | | |
|---|---|---|---|
| 1,934,618 | 11/1933 | Briggs et al. | 264/207 |
| 1,944,378 | 1/1934 | Thenoz | 264/207 |
| 2,063,435 | 12/1936 | Herzog | 425/72 S |
| 2,131,810 | 10/1938 | Kinsella et al. | 425/72 S |
| 2,366,275 | 1/1945 | McComb | 425/72 S |
| 3,271,818 | 9/1966 | Bryan | 425/72 S |
| 3,493,459 | 2/1970 | McIntosh et al. | 264/177 F |
| 3,600,491 | 8/1971 | Shimoda et al. | 264/177 F |
| 3,737,508 | 6/1973 | Weir | 264/205 |
| 4,356,134 | 10/1982 | Reinehr et al. | 264/206 |

FOREIGN PATENT DOCUMENTS

| | | | |
|---|---|---|---|
| 37-7917 | 11/1962 | Japan | 264/207 |
| 54-131029 | 10/1979 | Japan | 264/177 F |
| 432718 | 9/1967 | Switzerland | 264/204 |
| 717156 | 10/1954 | United Kingdom | 264/204 |

*Primary Examiner*—Jay H. Woo
*Attorney, Agent, or Firm*—Sprung, Horn, Kramer & Woods

[57] ABSTRACT

Hollow polyacrylonitrile fibers having a uniform closed cavity structure are obtained by dry-spinning filament-forming acrylonitrile polymers from a solution through a spinning jet comprising annular jet bores of the type shown in FIG. 1, the solution having a viscosity of at least 120 falling-ball seconds, as measured at 80° C. or of at least 75 falling-ball seconds, as measured at 100° C., the ring of the annular jet bores consisting of three, preferably equally large, ring segments at a distance from one another of at most 0.2 mm, the surface area of the jet bores of the profile jet amounting to less than 0.2 mm² and the side width of the ring segments amounting to at most 0.1 mm, the spinning air acting on the filaments transversely of the direction in which they are taken off relative to the center of the spinning jet.

10 Claims, 7 Drawing Figures

PROCESS FOR THE PRODUCTION OF DRY-SPUN HOLLOW POLYACRYLONITRILE FIBERS AND FILAMENTS

BACKGROUND OF THE INVENTION

The production of hollow fibers by melt spinning or by wet spinning has been known for many years. The processes described in numerous patents are essentially based on three methods.

In the first method, a molten polymer, for example a polyester, is spun from a jet comprising adjacent arc segments. Synthetic hollow fibers are produced by expanding the molten polymer below the jet and allowing the ends of the arc segments to flow continuously into one another. The second method is based on the use of a cavity needle which has to be placed at the center of the jet orifice, gases or filling media being pumped through the cavity needle. The polymer flows around the needle and the gas fills the cavity in the middle and stabilizes the shape of the hollow filament until the polymer has cooled. Hollow viscose filaments in particular are produced in this way, castor oil, for example, being used as the lumen-filling medium. Finally, in the third method, a fixed pin extends into the jet orifice. This spinning process is generally difficult because the polymer tends to assume a closed form. Although this process is particularly suitable for cross-sectional modifications, air has to be introduced or a vacuum applied at the end of the pin to produce hollow fibers.

In the meantime, hollow fibers and filaments have been used for various applications. For example, they are used for the desalination of seawater, for cleaning liquids and gases, as ion exchangers, for reverse osmosis, dialysis and ultrafiltration (artificial kidneys) and, by virtue of their light weight and high bulk, for luxury clothing. The cleaning of materials, for example, industrial gases, has become particularly important in recent years. Comprehensive articles on the production and significance of synethetic hollow fibers can be found in *Encyclopedia of Polymer Science and Technology*, 15, (1971), pages 258–272, in Acta Polymerica, 30, (1979), pages 343–347 and in *Chemical Engineering*, February 1980, pages 54–55.

Hitherto, there has also been no shortage of attempts to produce hollow acrylic fibers by dry spinning from a spinning solution. On account of the problems involved, however, no technical process for the production of hollow acrylic fibers on this principle has ever been successfully developed.

In this context, hollow fibers are understood to be fibers which have a continuous bore extending longitudinally throughout their interior.

Whereas acrylonitrile polymers can be wet-spun relatively easily into hollow fibers by one of the methods described above, this leads to considerable difficulties where dry spinning is used because of a different filament forming mechanism. In wet spinning the filament is formed by coagulation of the spinning solution in an aqueous precipitation bath containing a solvent for polyacrylonitrile, the concentration and temperature of the precipitation bath and additional coagulants, such as aqueous salt solutions, for example, being variable within wide limits. Thus, DE-OS No. 23 46 011, for example, describes the production of hollow acrylic fibers by method 2 for a wet spinning process using aqueous DMF as the precipitation bath whereas DE-OS No. 23 21 460 uses aqueous nitric acid as the precipitation bath, the filament being spun from jets having annular orifices and a liquid being introduced as an internal precipitant into the middle part of the annular orifice.

Any attempt to apply methods 1 to 3 to a dry spinning process is met with considerable difficulties because, where filaments are spun from a spinning solution, some of the solvent has to be evaporated after emerging from the jet orifice to achieve filament formation and hardening. On account of the considerable technical outlay involved and the difficulties in carrying out the process in the production of hollow acrylic fibers by dry spinning from spinning solutions, methods 2 and 3 were not developed any further.

Attempts to dry spin hollow fibers by method 1 from so-called profile jets comprising adjacent arc segments generally result in the formation of only dumbbell-shaped or irregular, bizarre cross-sections containing pockets of air at irregular intervals. If the concentration of polymer solids is increased to obtain the required cavity profile by increasing the structural viscosity, unexpected problems arise. The extent to which the solids content can be increased is limited on account of the gelation, fluidity and handling of spinning solutions of the type in question. For example, an acrylonitrile copolymer of which the chemical composition is 93.6% acrylonitrile, 5.7% methylacrylate and 0.7% sodium methallyl sulphonate and which has a K-value of 81 can only be dissolved in a spinning solvent, such as dimethyl formamide, and spun into filaments up to a solids concentration of at most 32% by weight. If an attempt is made to increase the solids content any further, spinning solutions of this type will gel on cooling at temperatures of only 50° to 80° C., with the result that uninterrupted spinning becomes impossible.

The object of the present invention is to provide a dry spinning process for the production of hollow acrylonitrile fibers, there being numerous potential applications for such hollow fibers and filaments.

SUMMARY OF THE INVENTION

It has now surprisingly been found that hollow polyacrylonitrile filaments can even be spun by a dry spinning process providing spinning solutions having a viscosity exceeding a certain value are used, jets comprising bores formed with segments of certain dimensions are used and the spinning air is allowed to act on the filaments in a certain way.

Accordingly, the present invention relates to a process for the production of hollow acrylonitrile fibers and filaments, characterised in that filament-forming acrylonitrile polymers are dry spun from a solution through a jet comprising annular jet bores, the solution having a viscosity of at least 120 falling-ball seconds, as measured at 80° C., or of at least 75 falling-ball seconds, as measured at 100° C., the ring of the annular jet bores comprising three, preferably equally large, ring segments having a distance between one another of at most 0.2 mm, the area of the jet bores of the profiled jet amounting to less than 0.2 mm$^2$ and the side width of the ring segments amounting to at most 0.1 mm, and the spinning air acting on the filaments transversely of the direction in which they are taken off from the middle of the jet.

Additional spinning air is preferably allowed to act on the filaments from outside, acting on the filaments in the transverse direction or, preferably, in the longitudinal direction. Jets comprising annular bores of 2 or 4 ring segments do not produce the required result, but instead the hollow fibers obtained have a whole series of leak-points and are unsuitable for most applications.

Spinning is followed by the further process steps normally applied in the dry spinning of polyacrylonitrile.

The viscosity in falling-ball seconds, as measured at 80° C. or at 100° C., is determined by K. Jost's method as reported by *Reologica Acta*, Vol. 1 (1958), page 303. The surface area of the jet bores is preferably smaller than 0.1 mm$^2$ and the side width between 0.02 and 0.06 mm. If the surface area of the spinning bores is greater than 0.2 mm$^2$, the cross-sectional form is in danger of collapsing. Nodular or shapelessly deformed bizarre structures lacking any definition are obtained.

According to DE-OS No. 27 06 032, spinning solutions which have the above-indicated viscosity and which contain an even higher concentration of the filament-forming polymer than otherwise usual are obtained by preparing correspondingly concentrated, readily pumpable suspensions of the filament-forming polymer in the required solvent and converting the suspensions thus prepared into spinning solutions of stable viscosity by briefly heating them to temperatures just below the boiling point of the spinning solvents used.

The suspensions required for preparing spinning solutions of this type are obtained by — if necessary — adding a non-solvent for the polymer to be spun to the spinning solvent and subsequently adding the polymer while stirring.

Non-solvents suitable for the purposes of the invention are any substances which are non-solvents for the polymer and which may be mixed within wide limits with the spinning solvents.

The boiling points of the non-solvents may be both below and above the boiling point of the spinning solvent used. Examples of substances of the type in question, which may exist in solid or liquid aggregate form, are alcohols, esters or ketones and also mono- and polysubstituted alkyl ethers and esters of polyhydric alcohols, inorganic or organic acids, salts and the like. Preferred non-solvents are, on the one hand, water by virtue of its simple handling and residue-free removal from the spinning duct and recovery and, on the other hand, gylcerol, mono- and tetra-ethylene glycol and also sugars.

Where non-solvents of which the boiling point is below the boiling point of the spinning solvent are used, hollow acrylic fibres are obtained which are distinguished from the known compact types by a considerably increased water retention capacity. Where non-solvents of which the boiling point is above that of the spinning solvent are used, acrylic fibers having a high water retention capacity are obtained, as already described in DE-OS No. 25 54 124. These fibers are distinguished by particular wearing properties. Whereas in the first case the non-solvent is removed from the spinning duct, it is necessary in the second case to wash the non-solvent out from the solidified fibers in another process step following the spinning process.

Where water is used as the non-solvent and where the acrylonitrile copolymer having a K-value of 81 mentioned above is used, hollow fibers may be dry-spun from the above-mentioned jets for a solids concentration of the spinning solution upwards of 36% by weight.

The water content of suspensions of polyacrylonitrile and dimethyl formamide of the type in question amounts to between 2 and 10%, based on the suspension as a whole. If less than 2% by weight of water is added, the suspension obtained is no longer free-flowing and pumpable, but instead assumes the form of a thick, heavy paste. If on the other hand the water content amounts to more than 10% by weight, the filaments burst below the jet during the spinning process under the effect of the high water vapor partial pressure prevailing in them as they emerge from the bores. The percentage water content of the spinning solution does not affect the profiling of the fibers in the jet. The sole determining factor is the concentration of polymer solids. With solids contents of up to 40%, percentage water contents of 2 to 3% have proved to be optimal for obtaining free-flowing, transportable suspensions at room temperature. If another non-solvent, such as propanol or butanol, is used instead of water, the same results are obtained. For acrylonitrile copolymers having K-values below 81, it is of course also possible to prepared even more highly concentrated spinning solutions. For example, from an acrylonitrile copolymer of 92% of acrylonitrile, 6% of methyl acrylate and 2% of sodium methallyl sulphonate having a K-value of 60, it is possible to prepare a suspension of 45% of copolymer solids, 4% of water and 51% of dimethyl formamide which has a viscosity of 142 falling-ball seconds, as measured at 80° C., which is still free-flowing at room temperature and which may be converted into hollow fibers by dissolution and spinning. On the other hand, where polymers having higher K-values are used, hollow fibers may be obtained by dry spinning solutions having an even lower solids concentration than the above-mentioned 36% spinning solutions having a K-value of 81. The profiling of the fibers in the jet is determined solely by the viscosity of the spinning solution.

Where monoethylene glycol is used as the non-solvent and where the acrylonitrile copolymer mentioned above is used, it is possible to prepare spinning solutions having solids concentrations of 36% by weight or higher of which the viscosities amounted to at least 75 falling-ball seconds, as measured at 100° C. These spinning solutions may be spun into hollow filaments and fibers which are distinguished by their high water retention capacity after removal of the non-solvent by washing and the usual aftertreatment. As already mentioned in DE-OS No. 25 54 124, the non-solvent content of suspensions such as these of polyacrylonitrile, dimethyl formamide and monoethylene glycol, should amount to at least 5% be weight, based so solvent and solids, to ensure that the filaments and fibers have a water retention capacity of at least 10%. The percentage non-solvent content in the spinning solution does not affect the profiling of the filaments in the jet. On the contrary, the determining factor is that the spinning solution should have a minimum viscosity. For solids contents of up to 40% by weight, non-solvent contents of from 5 to 10% by weight have proved to be optimal for obtaining hollow acrylic fibers having a water retention capacity of greater than 10%. The solid mass surrounding the continuous bore extending longitudinally throughout the interior of the fibers has a core-jacket structure. The thickness of the fibers jacket may be varied within wide limits through the ratio of polymer solids to non-solvent content. In accordance with the observations made on the use of water as non-solvent, it is also the case where non-solvents having a boiling point above the boiling point of the spinning solvent are used that acrylonitrile copolymers having K-values below 81 give the required minimum viscosity in a relatively high conventration whilst acrylonitrile copolymer having K-values above 81 give the required minimum viscosity in a relatively low concentration in the spinning solution.

Determination of the minimum viscosity may be carried out at two different temperatures, namely at 80° C. and at 100° C. This measure takes into account the fact that, on the one hand, the viscosity of spinning solutions containing water as the non-solvent is difficult at 100° C. on account of evaporation of the water, whereas on the other hand measurement of the viscosity of other spinning solutions containing as the non-solvent a substance of which the boiling point is above that of the spinning solvent can be problematical at 80° C. on account of the tendency towards gelation which occurs. However, the viscosity of aqueous spinning solutions may even be measured at 100° C., providing measurement is carried out in a closed system.

Providing the spinning solution to be spun gives a finite falling-ball second value, the production of hollow acrylonitrile fibers from the spinning solution in question is possible in principle. On economic grounds, however, spinning solutions having viscosities exceeding 300 falling-ball seconds, as measured at 80° or 100° C., can no longer be processed without difficulty in conventional spinning installations, resulting in a natural upper limit to the viscosity range.

Accordingly, the viscosity preferably amounts to between 120 and 300 falling-ball seconds at 80° C. and to between 75 and 300 falling-ball seconds at 100° C.

In addition to dimethyl formamide, solvents which boil at even higher temperatures, such as dimethyl acetamide, dimethyl sulphoxide, ethylene carbonate and N-methyl pyrrolidone and the like, may be used as the spinning solvents.

Suitable acrylonitrile polymers for the production of hollow fibers and filaments are acrylonitrile homopolymers and copolymers, the copolymers containing at least 50% by weight and preferably at least 80% by weight of copolymerized acrylonitrile units.

As already mentioned, the side width and interval between the ring segments are important factors in addition to the surface area of the jet bore. In the context of the invention, the side width of a profiled jet is understood to be the distance in mm between the outer boundary of the profile in question and not the distance from the center of the jet bore.

The fibers according to the invention are distinguished not only by their already mentioned properties for dialysis and ultrafiltration purposes, but also and in particular by their high water retention capacity. As mentioned in DE-OS No. 27 19 019, sheet-form textiles made of fibers of the type in question are comfortable to wear. The water retention capacity amounts to at least 10% in every case where the hollow fibers are uniform without any openings and have a constant percentage cavity content. Where the hollow fibers have non-uniform cross-sectional forms and also partly open, partly closed cross-sectional forms, the water retention capacity varies according to the percentage cavity content. The water retention capacity is determined in accordance with DIN Specification 53 814 (cf. *Melliand Textilberichte*, 4, 1973, page 350).

The fiber samples are immersed for 2 hours in water containing 0.1% of wetting agent. Thereafter, the fibers are centrifuged for 10 minutes at an acceleration of 10,000 m/sec$^2$ and the quantity of water retained in and between the fibers is gravimetrically determined. In order to determine their dry weight, the fibers are dried to a constant moisture content at a temperature of 105° C. The water retention capacity (WR) in % by weight is:

$$WR = \frac{m_f - m_{tr}}{m_{tr}} \times 100$$

$m_f$ = weight of the moist fibers
$m_{tr}$ = weight of the dry fibers.

On account of their structure, hollow fibers of the type in question tend to undergo cross-sectional deformation under load at high temperatures. If, for example, an endless hollow cable is dried at temperatures above 160° C., individual hollow capillaries burst open to form irregular, partly open fiber cross-sections and a high percentage of short fibers. The following procedure has proved to be optimal for the aftertreatment of the fibers according to the invention: washing - drawing - preparation - predrying - crimping - cutting - drying at a temperature of up to at most 140° C. The predrying step is preferably carried out at a temperature in the range of from 80° to 100° C. whilst the final drying step is preferably carried out at from 110° to 130° C. If, as just mentioned, the hollow acrylic fibers according to the invention are aftertreated, the hollow fibers obtained are uniform without any openings and have identical percentage cavity contents.

BRIEF DESCRIPTION OF THE DRAWINGS

FIG. 1 shows a jet bore of the type used in accordance with the invention.

FIGS. 2 and 3 show the arrangement of the jet bores illustrated in FIG. 1 and in the spinning jet.

FIG. 4 shows a jet bore comprising two ring segments which is not suitable for use in accordance with the invention.

FIGS. 5 and 6 show the arrangement of the jet bores illustrated in FIG. 4 in the spinning jet.

FIG. 7 shows a jet bore comprising four ring segments which is not suitable for the purposes of the invention.

EXAMPLES

Example 1

59 kg of dimethyl formamide (DMF) are mixed with 3 kg of water by stirring in a vessel at room temperature. Thereafter 38 kg of an acrylonitrile copolymer of 93.6% of acrylonitrile, 5.7% of methyl acrylate and 0.7% of sodium methallyl sulphonate having a K-value of 81 are added with stirring at room temperature. The suspension is pumped by a gear pump into a stirrer-equipped spinning vessel. The suspension which has a solids content of 38% by weight and a water content of 3% by weight, based on the solution as a whole, is then heated with steam at 4.0 bars in a double-walled tube. The residence time in the tube is 7 minutes. The temperature of the solution on leaving the tube is 138° C. The tube is equipped with several mixing combs for homogenizing the spinning solution. After leaving the heating stage, the spinning solution, which has a viscosity of 176 falling-ball seconds at 90° C., is filtered without intermediate cooling and delivered directly to the spinning duct.

Example 2

Figure 1:
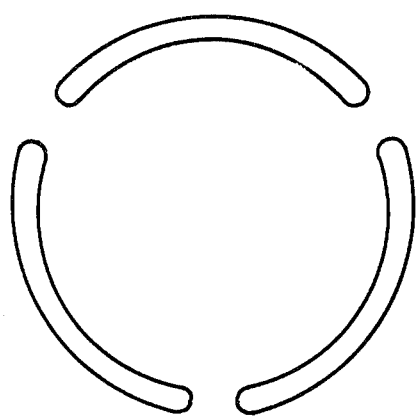
FIGS. 1 to 7 of the accompanying drawings show jet bores and their arrangement in the spinning jet as used in the process according to the invention and those which used in the same way, do not produce the required result.
Figure 2:
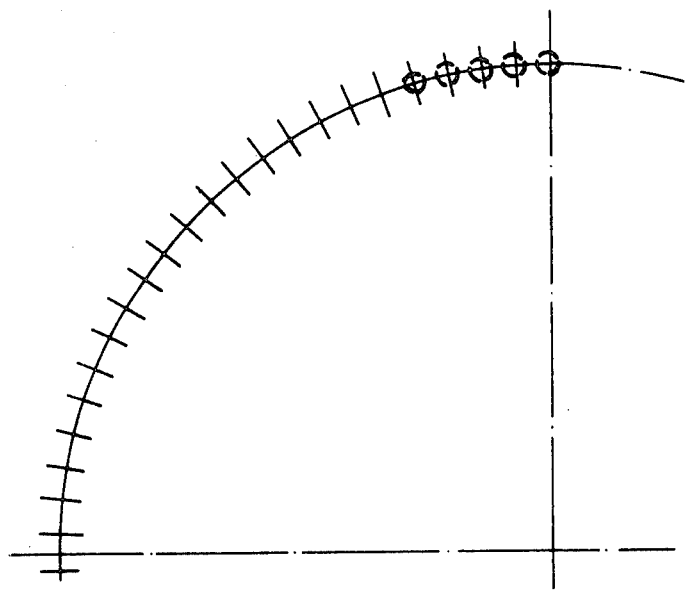

(a) Part of the spinning solution of Example 1 is dry spun from a 90-bore spinneret comprising annular jet bores of which the ring consists of 3 equally large ring segments (cf FIG. 1). The jet bores are arranged in the spinning jet in the same way as shown in FIG. 2. The surface area of the jet bores amounts to 0.16 mm$^2$, the side width 0.05 mm and the distance between two adjacent ring segments to 0.15 mm. The duct temperature is 160° C. and the air temperature 120° C. The amount of air passed through, which flows out in all directions from the middle of the spinning duct at one end thereof onto the bundle of filaments issuing from the spinning jet in the immediate vicinity thereof and transversely of the filaments, amounts to 30 m$^3$/h. The take-off speed of the filaments amounts to 200 meters per minute. The spun filaments, which have a denier of 950 dtex, are collected on bobbins, doubled to form a strand having a total denier of 142,500 dtex, subsequently washed in water at 80° C., drawn in boiling water in a ratio of 1:4, provided with an antistatic preparation, crimped, cut into 60 mm long staple fibers and subsequently dried at 120° C. on a screen belt dryer. The hollow fibers, of which the final denier amounts to 3.3 dtex, have a tensile strength of 2.6 cN/tex and a breaking elongation of 33%. Their water retention capacity amounts to 34.3%. In order to examine the cross-sectional geometry be microscope, the fiber capillaries were embedded in methyl methacrylate and cross-cut. Photographs taken under an optical microscope by the differential interference contrast process show that the sample cross-sections of the fibers have a completely uniform, round cavity structure. The percentage cavity content of the overall cross-sectional area measures approximately 50%.

(b) Another part of the spinning solution is dry-spun from a 90-bore spinning jet in the same way as described in Example 2(a), the 40 m$^3$/h throughput of spinning air being split into halves under otherwise the same spinning conditions, one half acting on the bundle of filaments from inside transversely of the direction in which they are taken off and the other half acting on the bundle of filaments from outside in the direction in which they are taken off. The spun filaments are further treated in the same way as in Example 2(a). The sample cross-sections of the fibers again show a completely uniform closed cavity structure.

Example 3

Figure 3:
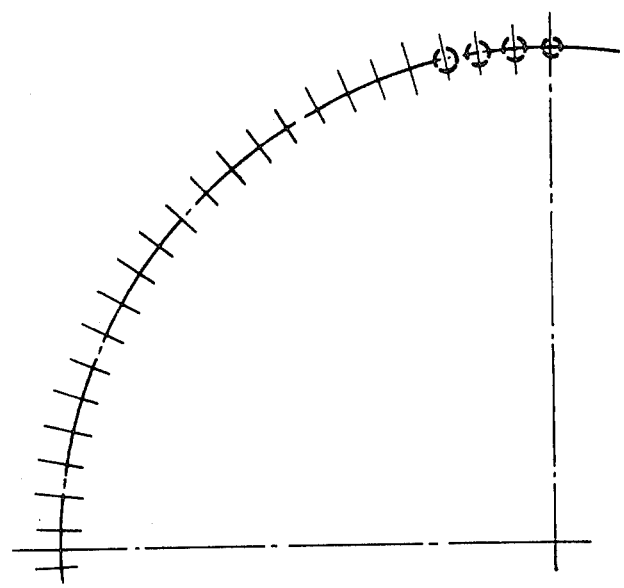

(a) A spinning solution of the type described in Example 1 is dry spun in the same way as in that Example from a 90-bore spinning jet comprising annular jet bores, of which the ring consists of three equally long ring segments, the arrangement of the jet bores corresponding to FIG. 3 for otherwise the same spinning conditions. The spun filaments are collected in the same way as in Example 2(a), doubled and aftertreated to form fibers having a final denier of 3.3 dtex. The sample cross-sections of the fibers again show a completely uniform closed cavity structure.

(b) Another part of the spinning solution is dry spun in the same way as in Example 3(b), the only difference being—for otherwise the same spinning conditions— that the spinning air acts on the issuing bundle of filaments both from outside in the direction in which the filaments are taken off and also from inside transversely of the direction in which they are taken off. The sample cross-sections of the fibers again show completely uniform closed cavity structures.

Example 4 (Comparative Example)

A spinning solution of the type described in Example 1 is dry spun in the same way as in that Example from a 90-bore spinning jet comprising annular jet bores of which the ring consists of three equally large ring segments, the arrangement of the jet bores corresponding to FIG. 2. The surface area of the jet bores amounts to 0.14 mm$^2$, the side width to 0.05 mm and the distance between two adjacent ring segments to 0.25 mm. All the other spinning conditions are the same as in Example 2(a). The sample cross-sections of the fibers obtained are not completely uniform and show varying percentage cavity contents. In cross-section, the individual hollow fibers clearly show three weak spots at uniform intervals from one another.

Example 5 (Comparative Example)

Figure 4:
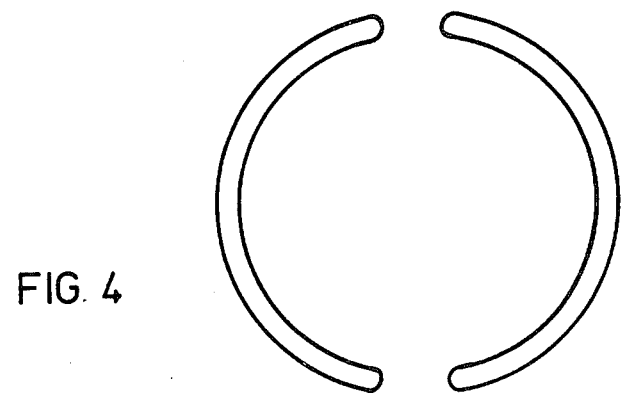
Figure 5:
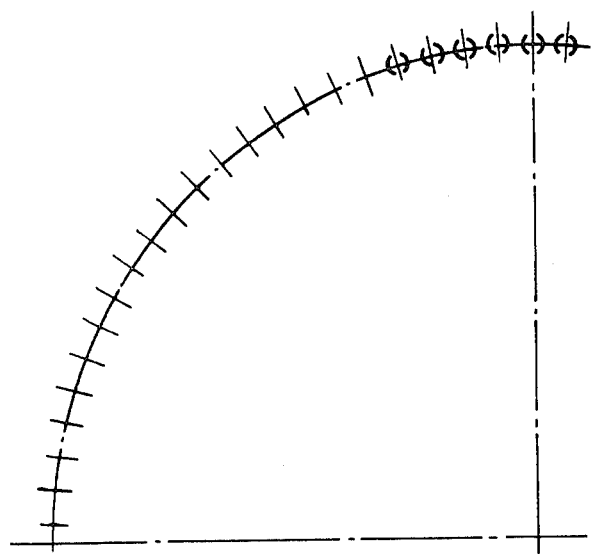

(a) A spinning solution of the type described in Example 1 is dry spun from a 90-bore spinning jet comprising annular jet bores of which the ring consists of two equally large ring segments (cf FIG. 4), the arrangement of the jet bores corresponding to FIG. 5. The surface area of the jet bores amounts to 0.17 mm$^2$, the side width to 0.05 mm and the distance between two adjacent ring segments to 0.2 mm. The spun filaments are collected, doubled and aftertreated to form fibers having a final denier of 3.3 dtex in the same way as described in Example 2(a). The sample cross-sections of the fibers lack uniformity and show varying percentage cavity contents. In some cases, there are individual crescent-shaped cross-sections where the denier of the fiber is reduced by half.

Figure 6:
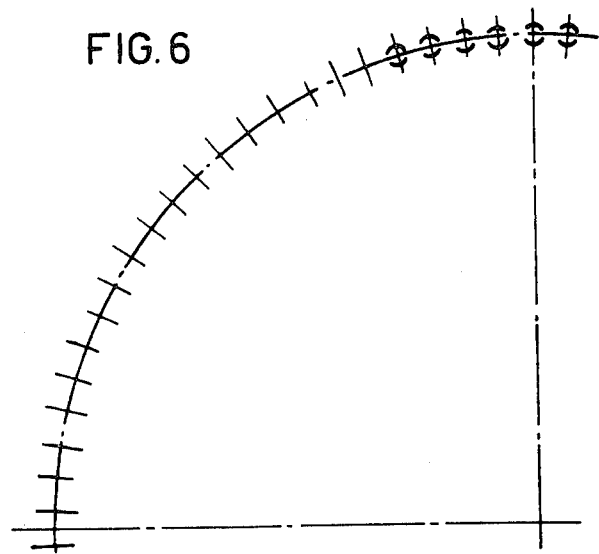

(b) Another part of the spinning solution is dry-spun as in Example 5(a) from a 90-bore spinning jet comprising annular jet bores of which the ring consists of two equally large ring segments, the only difference being—for otherwise the same spinning conditions—that the orifices of the profiled jet lie transversely of the central point of the duct (FIG. 6). The sample cross-sections of the fibers again do not show a uniform cavity structure. Approximately 30% of the fibers have crescent-shaped cross-sections where their denier is reduced by half.

(c) The tests described in Examples 5a and 5b are repeated with the sole difference—for otherwise the same conditions—that the spinning air is guided in such a way that part of the spinning air acts on the filaments from inside transversely of the direction in which they are taken off whilst the rest of the spinning air acts on the filaments from outside in the direction in which they are taken off. No improvement in the cross-sectional structure of the fibers thus obtained is achieved.

Example 6 (Comparative Example)

Figure 7:
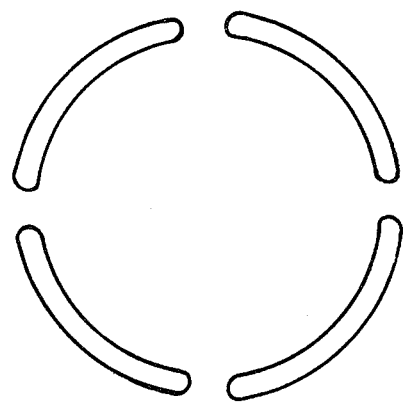

A spinning solution of the type described in Example 1 is dry spun as described in that Example from a 90-bore spinning jet comprising annular jet bores of which the ring consists of four equally large ring segments (cf FIG. 7). The surface area of the spinning bores amounts to 0.13 mm$^2$, the lateral width to 0.04 mm and the distance between two adjacent ring segments to 0.1 mm.

The spun filaments are collected, double and after-treated to form fibers having a final denier of 3.3 dtex in the same way as described in Example 2(a). The sample cross-sections of the fibers lack uniformity and show varying percentage cavity contents. A change in the throughput of air in such a way that some of the air acts on the filaments from inside transversely of the direction in which they are taken off whilst the rest of the air acts from outside in the direction in which they are taken off, does not bring about any significant improvement.

What is claimed is:

1. A process for the production of hollow polyacrylonitrile fibers and filaments, comprising dry spinning filament-forming acrylonitrile polymers from a solution through a jet having annular jet bores in a ring, the solution having a viscosity of at least 120 falling-ball seconds, as measured at 80° C., or of at least 75 falling-ball seconds, as measured at 100° C., the ring of the annular jet bores having three ring segments having a distance between one another of at most 0.2 mm, the area of the jet bores of the profiled jet being less than 0.2 mm$^2$ and the side width of the ring segments being at most 0.1 mm, and directing spinning air on the filaments from inside the ring in a transverse direction relative to the travel direction of the filaments as the filaments are taken off from the middle of the jet.

2. A process as claimed in claim 1, wherein the spinning air is directed on the filaments from inside and outside of the ring in a transverse direction relative to the travel direction of the filaments as the filaments are taken off from the middle of the jet.

3. A process as claimed in claim 1, wherein the surface area of the jet bores is less than 0.1 mm$^2$ and the side width of the ring segments is between 0.02 and 0.06 mm.

4. A process as claimed in claim 1, wherein the solution contains a non-solvent for the polymer which is miscible within wide limits with the spinning solvent.

5. A process as claimed in claim 4, wherein said non-solvent is selected from the group consisting of water, glycerol, monoethylene glycol, tetraethylene glycol and sugars.

6. A process as claimed in claim 1, wherein the viscosity of the solution is between 120 and 300 falling-ball seconds, as measured at 80° C., and is between 75 and 300 falling-ball seconds as measured at 100° C.

7. A process as claimed in claim 1, wherein all of said ring segments are circular in shape.

8. A process as claimed in claim 1, wherein all of said ring segments are of about equal circumferential dimension.

9. A process as claimed in claim 1, wherein said solution has a water content of between about 2% and 10%.

10. A process as claimed in claim 2, wherein said spinning air acting on the filaments from the outside ring is directed on said filaments in a longitudinal direction relative to the travel direction of the filaments.

* * * * *